April 22, 1958   W. H. CINCEL   2,831,495
SAFETY CAP FOR INFLATING VALVES
Filed Nov. 21, 1955

INVENTOR.
WALTER H. CINCEL
BY
*Jerome P. Bloom*
HIS ATTORNEY

United States Patent Office 2,831,495
Patented Apr. 22, 1958

2,831,495

SAFETY CAP FOR INFLATING VALVES

Walter H. Cincel, Dayton, Ohio, assignor to Cinvo
Products Inc., Dayton, Ohio

Application November 21, 1955, Serial No. 548,091

9 Claims. (Cl. 137—233)

This invention relates to a valve guard unit which is particularly applicable to provide a novel safety cap for inflating valves such as are employed in pneumatic tires and tubes and the like.

Various means have been proposed in the prior art in efforts to provide a safety device which would be applicable to the inflating valves of pneumatic tires and tubes to prevent children or other persons or sources from maliciously or inadvertently causing depression of a valve core and thereby deflating the tire or tube associated therewith. The majority of these prior art devices are either valve caps which lock to the valve stem of an inflating valve and must be removed to permit inflation, or else they constitute complex valving members. The use of such devices in application to pneumatic tires and tubes and the like has generally resulted in an awkward and unsatisfactory inflation procedure. And they have proven to be relatively inefficient.

The subject invention was developed to avoid the undesirable aspects of these prior art devices. It provides an inexpensive simple valve adapter or guard unit which can be quickly and easily secured in releasable fashion to the valve stem of an inflating valve without the need for any particular tool in the process thereof. It affords a positive valve capping device which provides for normal inflation therethrough utilizing means such as are commonly available at all service stations. However, it will only provide free access to the valve to which it mounts when subjected to an incoming fluid pressure which is greater than the fluid pressure within the tire or tube associated therewith. When the valve capping device is actuated by means other than the inflating medium under the prescribed high pressure, it automatically provides a seal across the valve to prevent the escape of air or other inflating medium therethrough on the opening of the valve core. The improved safety cap also provides an improved configuration enabling a quick friction lock thereof to a valve element.

An object of the invention is to provide a novel adapter or safety cap for a valve unit.

Another object of the invention is to provide a new and improved safety unit constituting a valve guard which can be readily secured to the valve stem of any pneumatic tire or tube so as to prevent inadvertent or malicious deflation thereof while providing means permitting free and normal inflation of the pneumatic device to which it is applied therethrough.

An additional object of the invention is to provide a new and improved safety capping means for the inflating valves of pneumatic tubes or the like including a seal element responsive to application of air thereto under pressure greater than that within the pneumatic device to admit inflating air thereto but operative to seal the valve on opening thereof under all other circumstances.

A further object of the invention is to provide a simple inexpensive safety cap for inflating valves having an improved construction that enables it to be fixedly secured to such valves without any special skill or tools being required in the process.

Another object of the invention is to provide a safety cap for valves possessing the advantageous structural features, the inherent meritorious characteristics, and the mode of operation herein mentioned.

With the above primary and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalent.

Referring to the drawings wherein is found the preferred but obviously not necessarily the only form of embodiment of the invention, Fig. 1 is a view of a tire valve having a preferred embodiment of the improved safety cap afforded by the invention mounted thereto and shown longitudinally sectioned.

Figure 1:
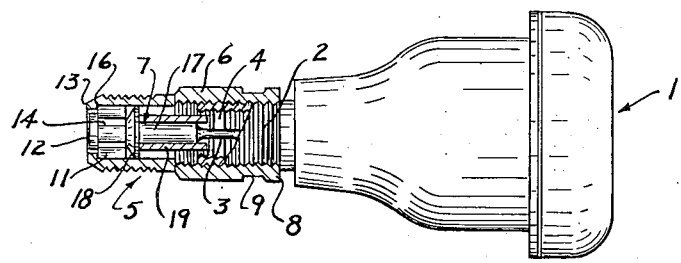
Figure 2:
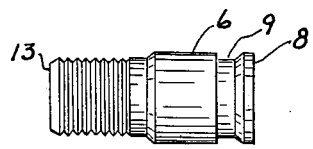
Fig. 2 is a detail view of the housing element of the safety cap as shown in Fig. 1.
Figure 3:
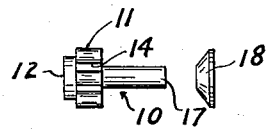
Fig. 3 is a detail view of the control unit of the safety cap shown in exploded fashion.
Figure 4:
Fig. 4 is a detail view of the sleeve element of the safety cap as shown in Fig. 1.

The invention can best be described with reference to the embodiment thereof shown in the drawings. Fig. 1 of the drawings shows a commonly used inflating valve for a tire identified by the numeral 1. The valve 1 is provided with a cylindrical projecting valve stem 2 which is threaded internally and externally. The valve core 3 of the valve extends centrally of the valve stem through the central aperture of a bearing 4 provided transversely within the valve stem and fixed therein.

The safety cap 5 consists of a housing 6, and a control unit 7. The housing 6 is generally cylindrical and internally threaded at the engaging end 8 thereof which threadedly engages externally of the valve stem 2. The housing 6 has a circumferential groove 9 in the external surface thereof at its valve engaging end. The depth of this groove 9 is such that the wall of the housing 6 at this point is very thin. Thus, on screwing the safety cap housing to the valve stem, a slight pressure on the wall thereof in the groove 9 will put a slight crimp therein to effect a friction lock thereof to the valve stem in its required position.

Slidably mounted longitudinally within the housing 6 is the control unit 7 which consists of a control pin 10 having a radially enlarged section 11 adjacent the outer end 12 thereof. The outer end 13 of the housing 6 is reduced in diameter and externally threaded. The enlarged section 11 of the control pin is in bearing relation to the internal surface of the housing 6 at its outer end and is provided with longitudinal grooves 14 equidistantly spaced thereabout. The outer end 15 of the pin 10 nests concentrically within the outer apertured end of the housing 6 which is reduced in diameter to provide an internal shoulder 16 therein. This shoulder 16 provides an abutment surface for the outer end surface afforded by the radially enlarged portion of the control pin 10. The inner end 17 of the pin 10 is relatively reduced in diameter and mounts a centrally apertured ring seal element 18 thereto in abutting relation to the inner end surface of the radially enlarged portion 11 of the control pin. The ring seal 18 is generally flat but of a size that on insertion of the control unit within the housing 6 from the enlarged end thereof, it is caused to assume a dish shaped configuration open to the inner end of the housing. The seal element is fabricated of a rubberized fabric to provide it with the necessary sealing and flexibility characteristics. A tubular sleeve element 19 mounts about the reduced inner end of the pin 10 and at one end thereof abuts the inner surface of the ring seal 18 to hold it against the radially enlarged portion of the pin and the other end thereof extends a predetermined distance beyond the inner end 17 of the pin for purposes to be described.

As the housing 6 of the safety cap is engaged to the valve stem 2 of the valve 1 and fixed thereto in the manner previously described herein, the inner end of the control pin 10 is brought into contacting relation to the outer end of the valve core 3. In the process, the sleeve about the inner end of the pin projects beyond the end of the pin and about the outer end of the valve core to a point in spaced relation to the bearing 4 fixed within the valve stem. The valve core is spring biased, of course, to maintain the inflating valve 1 in its normally closed position, and in contacting relation to the inner end of the control pin 10.

The operation of the safety cap in application to the valve element is as follows. When it is desired that the pneumatic element with which the valve 1 is connected is to be inflated, it may be accomplished without removing the safety cap. The usual inflating means provided in all service stations may be applied over the outer open end of the housing 6. The adapter on the house from the compressed air source will depress the control pin 10 to open the valve core in contacting relation therewith. If the air directed into the housing 6 is at a greater pressure than the air within the pneumatic device in which the valve 1 is connected, it will be channeled through the grooved portions 14 of the radially enlarged section 11 of the control pin between it and the inner wall of the housing 6 to flex the ring seal element 18 and pass through the valve and effect the desired inflation of the pneumatic device. If the incoming pressure is below that within the pneumatic device, then when the valve is opened, the air within will apply a pressure to the dish shaped flexible ring seal greater than the pressure externally thereof, and the edges of the ring seal will seal across the housing 6 and prevent escape of air from the pneumatic device through the open valve 1. Similarly, if any person or other source should deliberately or inadvertently depress the control pin and open the valve 1, the inner pressure within the pneumatic element will immediately effect a sealing action of the ring seal element 18 across the housing 6 so that the pneumatic device cannot be deflated in this manner. Thus, as long as the novel safety cap is mounted to the valve, the device in which it seats for inflation cannot be deflated in this manner. It provides a positive substantially tamper proof inflation of a pneumatic device. And the provision for a thin wall section to housing 6 affords means for quick and easy frictional lock of the safety cap to any valve unit of a standard nature. The threads are not damaged thereby and the cap can be removed and used again.

The sleeve 19 serves to limit the travel of the control pin by engaging the bearing 4 of the valve core 3 and thus prevents damage to the valve core thereby. It is noted that a standard dust cap may be employed on the outer end of the housing 6.

The device afforded by the invention is very simple yet very effective and has considerable utility in a wide range of applications to pneumatic devices.

From the above description it will be apparent that there is thus provided a device of the character described possessing the particular features of advantage before enumerated as desirable, but which obviously is capable of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprises the preferred form of the several modes of putting the invention into effect, and the invention is therefore claimed in any of its forms or modifications within the legitimate and valid scope of the appended claims.

I claim:

1. In combination with a conventional tire inflation valve assembly of the type having an inflation valve and an operating stem therefor, a cap having a passage therethrough mounted on the outer end of said inflation valve assembly and in axial alignment therewith, means locking said cap to said assembly, said cap housing a reciprocable valve disc of resilient material mounted on a pin intermediate the ends thereof, said pin having one end engageable with the outer end of the operating stem of the inflation valve whereby movement of said disc and pin towards said inflation valve moves said operating stem to open the inflation valve, rigid backing means on the outer end of said pin engageable by said resilient valve disc to prevent flexing thereof in a direction away from said inflation valve, said resilient valve disc having its periphery in yieldable, sliding and sealing contact with said passage whereby it will flex to permit flow of fluid toward said inflation valve when the latter is unseated by said pin but will engage the walls of said passage to prevent flow of fluid in the opposite direction while said inflation valve is in said unseated position.

2. In combination with an inflating valve assembly having a valve and operating means therefor, a cap type housing having a passage therethrough, said housing including means on one end locking said housing on the outer end of the valve assembly with said passage in communication with the valve and valve operating means therein, a control means in the passage in said housing having a flexible skirt element thereabout in sliding relation to the housing wall defining said passage, means on said control means and on said housing limiting the outward movement of said control means relative said housing, means preventing flexing of said skirt outward of said housing, said control means being operative for movement thereof inwardly relative said housing to engage the valve operating means and open the valve, said flexible skirt being responsive on opening of the valve to flex and expand and provide a positive seal of said passage on flow of fluid from the open valve, said skirt being further responsive to introduction of inflating fluid through the passage in said housing from its outer end to flex and permit flow of the fluid to the open valve until the pressure to either side of said skirt is equalized.

3. In combination with an inflating valve assembly having an inflation valve and an operating stem therefor, a housing having friction lock means mounting said housing on the outer end of the inflation valve assembly, said housing having a passage therethrough communicating with the inflation valve and operating stem on mounting thereof to the valve assembly, control means slidably mounted in said housing for movement in said passage to engage the operating stem and open the inflation valve, and resilient seal means about said control means extending transversely of said passage and towards the inflation valve to which said housing mounts, means preventing flexing of said seal means away from said inflation valve, said seal means being responsive to opening of the inflation valve to be pressured by fluid therefrom into sealing relation across said passage and further responsive to introduction of an inflating medium under pressure through the passage in said housing to flex and admit the inflating medium thereby to the open valve until the pressure to either side of said seal means is equalized.

4. In combination with a conventional tire inflation valve assembly or the like having a valve and an operating stem therefor, a cap housing having a passage therethrough including means on the end locking the housing over the outer end of the tire inflation valve assembly so as to place the passage in communication with the tire valve and operating stem, a peripherally flexible valve positioned transversely of the passage in said cap housing having a pin connected thereto actuable for sliding movement therewith axially of said passage to engage the inflation valve operating stem and open the tire valve, means on said housing limiting relative outward movement of said peripherally flexible valve and said pin, means preventing flexing of said peripherally flexible valve away from said inflation valve, said peripherally flexible valve flexing to permit introduction of inflating fluid thereby on opening of the tire valve by said pin but flexing to seal the passage in said cap housing to prevent flow of fluid in the opposite direction while the tire valve is open.

5. A safety device in combination with an inflating valve assembly including a valve and a valve operating means therein comprising a cap means having an aperture therethrough and having locked engagement over the outer end of the inflating valve assembly, a valve opening means slidably mounted in said cap means and in the portion defining the aperture therein, said valve opening means being actuable and directed for displacement in said cap means for engagement with the valve operating means to open the valve in the inflating valve assembly, a resilient element within the apertured cap engaging therewith and with said valve opening means to normally close the aperture through said cap means, means preventing flexing of the resilient element away from said inflation valve, said resilient element being so mounted relative said valve opening means and cap means that on opening of the inflation valve by operation of said valve opening means, fluid escaping from the inflation valve will cause said resilient element to normally seal the aperture in said cap means, said resilient element being responsive to introduction of inflating fluid through the aperture in said cap means under pressure greater than applied to the inflating valve side thereof to admit inflating fluid thereby.

6. In combination with an inflating valve assembly including a valve and an operating stem therefor, a cylindrical housing having a passage axially therethrough, said housing having one end portion thereof substantially reduced in thickness and applied to the outer end of the inflating valve, a crimp therein to frictionally lock the housing to the valve assembly in axial alignment therewith, control means slidable in said housing in said passage and formed to provide passageway between it and the wall defining the passage in said housing, said control means including a reduced pin like extremity projecting towards the valve operating stem, said control means being engageable through the outer end of said housing to project its extremity to engage the operating stem and open the inflating valve thereby and a resilient ring valve about said control means adjacent its pin extremity in said housing passage and normally closing said housing passage thereby, means preventing flexing of said resilient ring valve away from said inflating valve, said ring valve being formed to flex to admit an inflating fluid thereby through said housing to the inflating valve on opening of the valve and to effect a seal across said housing passage between the housing and said control means to prevent flow of fluid in the opposite direction.

7. In combination with an inflating valve assembly including a valve and a valve operating stem therefor, a tubular housing having means at one end locking the inflating valve assembly in axial alignment therewith, an internal flange on the inner wall of said tubular housing at its other end, a cap valve assembly slidably and floatably mounted in said housing in bearing relation thereto having means disposed to axially align with the inflating valve operating stem on mounting of said housing to the inflating valve assembly, said flange limiting outward movement of said cap valve assembly relative said housing, said cap valve assembly being movable in said housing to engage the operating stem of the inflation valve assembly to which it mounts and open the inflation valve, pressure responsive means in said cap valve assembly operative on introduction of inflating fluid into said other end of said housing to provide passage for the fluid thereby to the open inflation valve and means preventing opening of said pressure responsive means in a direction away from said inflating valve to prevent flow of fluid from the inflation valve thereby.

8. In combination with a conventional inflation valve assembly having an inflation valve and an operating stem therefor, a cap housing of a tubular nature having an internal flange one end and means at the other end locking said housing to the outer end of the conventional inflation valve, a slidably mounted control pin having a relatively expanded and peripherally channelled portion bearing on the inner wall of said housing on the flanged end thereof and a relatively reduced portion projecting to the inflation valve operating stem on mounting of said housing to the inflation valve assembly, a flexible ring flap about the reduced portion of said pin, abutting the relatively expanded portion thereof, peripherally directed to said other end of the housing and engaging the inner wall thereof, said flange limiting outward movement of said control pin, said pin being displaceable towards said other end of said housing to engage the operating stem and open the inflation valve, means preventing the ring flap from flexing toward said flange, said flap means flexing on introduction of inflating fluid through said housing from said one end to admit the fluid through to the open valve and flexing oppositely in response to flow of fluid from the inflating valve to seal said housing and prevent escape of fluid therefrom.

9. In combination with a conventional tire valve assembly of the type having an inflation valve and an operating stem therefor, a safety cap including a tubular housing having an annular flange projecting internally at one end thereof and means at the other end having locking engagement with the outer end of the tire valve in axial alignment therewith, a control pin slidably mounted in said housing having a pressure responsive resilient element mounted thereabout and conically disposed to diverge to said other end of said housing in yieldable sliding contact with the inner wall of said housing, means projecting from said pin for engagement with said flange to limit the movement of said pin outwardly of said housing, said control pin axially aligning with the valve operating stem on mounting said housing to the tire valve and being displaceable towards said other end of the housing to engage the operating stem to open the tire valve, and means preventing flexing of said pressure responsive resilient element toward said flange whereby on introduction of inflating fluid in said housing at said one end said pressure responsive means will adapt to permit flow of fluid to said inflation valve when opened by said pin, said pressure responsive means expanding on flow of fluid from the valve to seal said housing and prevent flow of fluid thereby.

References Cited in the file of this patent

UNITED STATES PATENTS

| | | |
|---|---|---|
| 661,672 | Schrader | Nov. 13, 1900 |
| 760,836 | Zister | May 25, 1904 |
| 1,887,293 | Dunois | Nov. 8, 1932 |
| 2,470,213 | Clemmons | May 17, 1949 |